(12) United States Patent
Le et al.

(10) Patent No.: US 12,514,550 B2
(45) Date of Patent: Jan. 6, 2026

(54) METHOD AND APPARATUS FOR WIRELESS PORTABLE ULTRASOUND IMAGING

(71) Applicant: DenSonics Imaging Inc., Edmonton (CA)

(72) Inventors: Lawrence Trong-Huan Le, Edmonton (CA); Edmond Hok-Ming Lou, Edmonton (CA); Kim-Cuong Thi Nguyen, Edmonton (CA); Paul William Major, Sherwood Park (CA); Neelambar Reddy Kaipatur, Edmonton (CA)

(73) Assignee: DenSonics Imaging Inc., Edmonton (CA)

( * ) Notice: Subject to any disclaimer, the term of this patent is extended or adjusted under 35 U.S.C. 154(b) by 0 days.

(21) Appl. No.: 17/604,748

(22) PCT Filed: Apr. 17, 2020

(86) PCT No.: PCT/CA2020/050518
§ 371 (c)(1),
(2) Date: Oct. 18, 2021

(87) PCT Pub. No.: WO2020/210917
PCT Pub. Date: Oct. 22, 2020

(65) Prior Publication Data
US 2022/0202394 A1 Jun. 30, 2022

Related U.S. Application Data

(60) Provisional application No. 62/835,915, filed on Apr. 18, 2019.

(51) Int. Cl.
*A61B 8/00* (2006.01)
*A61B 8/08* (2006.01)
(Continued)

(52) U.S. Cl.
CPC .......... *A61B 8/4472* (2013.01); *A61B 8/0875* (2013.01); *A61B 8/12* (2013.01);
(Continued)

(58) Field of Classification Search
CPC ....... A61B 8/4472; A61B 8/0875; A61B 8/12; A61B 8/4281; A61B 8/4488;
(Continued)

(56) References Cited

U.S. PATENT DOCUMENTS

| 4,637,256 A | 1/1987 | Sugiyama et al. |
| 6,589,054 B2 | 7/2003 | Tingley et al. |

(Continued)

FOREIGN PATENT DOCUMENTS

| CN | 1794005 A | * | 6/2006 | .......... G01R 33/565 |
| DE | 102015011388 A1 | | 3/2017 | |

(Continued)

OTHER PUBLICATIONS

Chifor, Radu et al., "Identification of the anatomical elements used in periodontal diagnosis on 40 MHz periodontal ultrasonography," Romanian Journal of Morphology & Embryology, 56(1):149-153, 2015. (5 pages).

(Continued)

*Primary Examiner* — Kaitlyn E Sebastian
(74) *Attorney, Agent, or Firm* — Foley & Lardner LLP

(57) ABSTRACT

Presented is a wireless portable ultrasound acquisition system for dental imaging, having an ultrasound probe with a control switch connected through a cable to a portable ultrasound acquisition system that communicates wirelessly with a smart tablet or a phone display to display the ultrasound images. The system uses ultrasound signals to create images of alveolar bone structure and boundaries of enamel, dentin and gingiva of a patient.

17 Claims, 15 Drawing Sheets

(51) Int. Cl.
*A61B 8/12* (2006.01)
*B06B 1/06* (2006.01)
*G06T 7/00* (2017.01)
*G06T 7/13* (2017.01)
*G06T 7/162* (2017.01)

(52) U.S. Cl.
CPC .......... *A61B 8/4281* (2013.01); *A61B 8/4488* (2013.01); *A61B 8/5269* (2013.01); *A61B 8/54* (2013.01); *A61B 8/56* (2013.01); *A61B 8/565* (2013.01); *B06B 1/0622* (2013.01); *B06B 1/067* (2013.01); *G06T 7/0016* (2013.01); *G06T 7/13* (2017.01); *G06T 7/162* (2017.01); *B06B 2201/76* (2013.01); *G06T 2207/10132* (2013.01); *G06T 2207/20192* (2013.01); *G06T 2207/20221* (2013.01); *G06T 2207/30008* (2013.01); *G06T 2207/30036* (2013.01)

(58) Field of Classification Search
CPC .......... A61B 8/5269; A61B 8/54; A61B 8/56; A61B 8/565; A61B 8/0858; A61B 8/4411; A61B 8/4427; A61B 8/4455; A61B 8/5223; A61B 8/5261; A61B 8/4444; B06B 1/0622; B06B 1/067; B06B 2201/76; G06T 7/0016; G06T 7/13; G06T 7/162; G06T 2207/10132; G06T 2207/20192; G06T 2207/20221; G06T 2207/30008; G06T 2207/30036; G06T 2207/20084; G06T 5/009; G06T 5/10; G06T 5/20; G06T 7/33; G06T 2207/20032; G06T 5/002; G06T 7/0012; G06T 7/11; G06T 7/187; G06T 2207/10081; A61C 9/0086; A61C 19/043
See application file for complete search history.

(56) References Cited

U.S. PATENT DOCUMENTS

| | | | |
|---|---|---|---|
| 6,638,219 B1 | 10/2003 | Asch et al. | |
| 6,702,746 B1 | 3/2004 | Srouji | |
| 2004/0143186 A1 | 7/2004 | Anisimov et al. | |
| 2006/0270935 A1* | 11/2006 | Ariff .................. | A61C 19/04 600/437 |
| 2013/0060144 A1* | 3/2013 | Culjat .................. | A61B 8/14 600/459 |
| 2016/0338590 A1* | 11/2016 | Sagalovich ............. | A61B 1/07 |
| 2017/0042507 A1* | 2/2017 | Koning ................ | A61B 8/4227 |
| 2017/0169276 A1* | 6/2017 | Agaian .................... | G06T 5/20 |
| 2017/0178327 A1* | 6/2017 | Somasundaram ..... | A61C 19/04 |
| 2017/0281110 A1* | 10/2017 | Mandelkern .......... | G06T 7/0014 |
| 2018/0197303 A1* | 7/2018 | Jordan ..................... | G06T 7/20 |
| 2018/0368912 A1 | 12/2018 | Katzberg | |
| 2019/0066345 A1* | 2/2019 | Peng .......................... | G06T 5/50 |
| 2019/0239855 A1* | 8/2019 | Park ..................... | A61B 8/4438 |
| 2020/0297318 A1* | 9/2020 | Srinivasa Naidu .... | G06N 3/045 |

FOREIGN PATENT DOCUMENTS

| | | |
|---|---|---|
| EP | 0353209 A1 | 1/1990 |
| JP | 6119013 B1 | 4/2017 |
| WO | WO-02085178 A2 | 10/2002 |
| WO | WO-03000137 A1 * 1/2003 .......... A61B 8/4483 |
| WO | WO-2008137030 A1 | 11/2008 |
| WO | WO-2014072427 A1 | 5/2014 |

OTHER PUBLICATIONS

Nguyen, Kim-Cuong T. et al., "High-Resolution Ultrasonic Imaging of Dento-Periodontal Tissues Using a Multi-Element Phased Array System," Annals of Biomedical Engineering, 44(10):2874-2886, Oct. 2016. (13 pages).

Chan, Hsun-Liang et al., "Non-invasive evaluation of facial crestal bone with ultrasonography," PLoS ONE, 12(2), Feb. 8, 2017. (8 pages).

Huysmans, M.C.D.N.J.M. et al., "Ultrasonic measurement of enamel thickness: at tool for monitoring dental erosion?" Journal of Dentistry, 18:187-191, 2000. (5 pages).

Sindi, Khalid Hussain et al., "In Vitro Enamel Thickness Measurements With Ultrasound," Ultrasound in Medicine and Biology, 41(1):301-308, 2015. (8 pages).

Tian, Yu-Iou et al., "Alveolar bone thickness around maxillary central incisors of different inclination assessed with cone-beam computed tomography," The Korean Journal of Orthodontics, May 6, 2015. (8 pages).

Rojo, Julio et al., "Facial alveolar bone width at the first and second maxillary premolars in healthy patients: A cone beam computed tomography study," Journal of Oral Implantology. (25 pages).

Nguyen, Kim-Cuong T. et al., "Imaging the Cemento-Enamel Junction Using a 20-MHz Ultrasonic Transducer," Ultrasound in Medicine & Biology, 42(1):333-338, 2016. (6 pages).

Zhang, Chan et al., "Measurements of ultrasonic phase velocities and attenuation of slow waves in cellular aluminum foams as cancellous bone-mimicking phantoms," The Journal of the Acoustical Society of America, 129(5):3317-3326, May 2011. (11 pages).

Ghassemian, Marjan et al., "The Thickness of Facial Alveolar Bone Overlying Healthy Maxillary Anterior Teeth," Journal of Periodontology, 83(2):187-197, Feb. 2012. (11 pages).

Zekry, Ahmed et al., "Facial alveolar bone wall width—a cone-beam computed tomography study in Asians," Clinical Oral Implants Research, 25:194-206, 2014. (13 pages).

Bushberg, Jerrold T. et al., "The Essential Physics of Medical Imaging," Third Edition, Wolters Kluwer Health, Lippincott Williams & Wilkins, 2012. (1043 pages).

Moon, H.S. et al., "The three-dimensional microstructure of the trabecular bone in the mandible," Surgical and Radiologic Anatomy, 26:466-473, 2004. (8 pages).

International Search Report and Written Opinion for International Application No. PCT/CA2020/050518, dated Jul. 17, 2020. (8 pages).

International Preliminary Report on Patentability for PCT App. PCT/CA2020/050518, dated Sep. 28, 2021 (6 pages).

EPO Search Report on PCT Appl. Ser. No. Ser. No. PCT/CA2020/050518 dated Nov. 30, 2022 (13 pages).

Nguyen Kim-Cuong T et al: "Graph Cuts-based Segmentation of Alveolar Bone in Ultrasound Imaging", 2018 IEEE International Conference on Bioinformatics and Biomedicine (BIBM), IEEE, Dec. 3, 2018 (Dec. 3, 2018), pp. 2049-2055, XP033507527, DOI: 10.1109/BIBM.2018.8621309 [retrieved on Jan. 21, 2019].

* cited by examiner

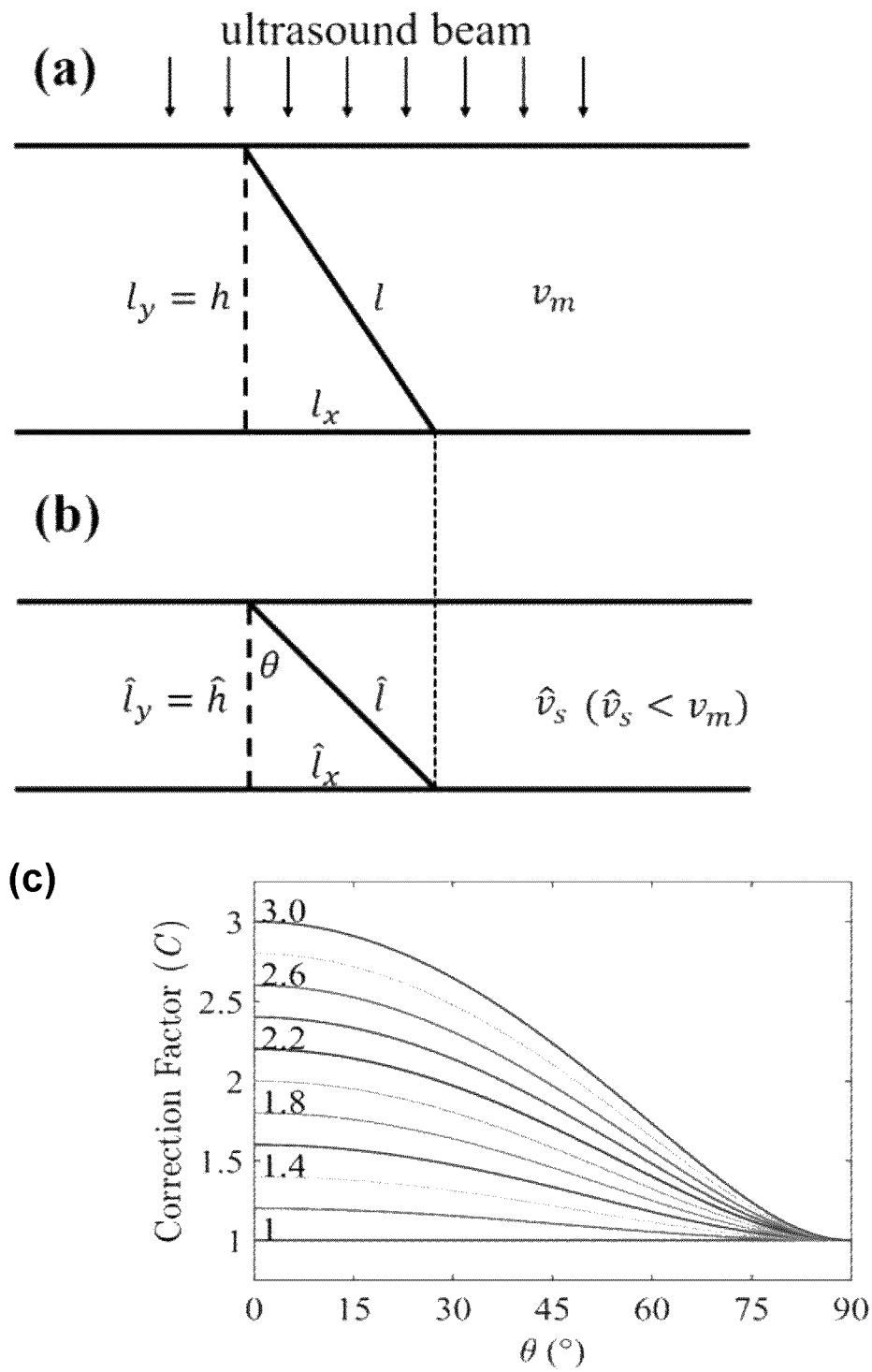
FIG. 3(a) and (b) and (c)

METHOD AND APPARATUS FOR WIRELESS PORTABLE ULTRASOUND IMAGING

CROSS-REFERENCE TO RELATED APPLICATIONS

This application is a national phase entry of International Patent Application No. PCT/CA2020/050518, filed Apr. 17, 2020, which claims priority of United States Provisional Patent Application Ser. No. 62/835,915, filed Apr. 18, 2019, both of which are incorporated by reference into this application in their its entirety.

TECHNICAL FIELD

The present disclosure is related to the field of methods and apparatuses for diagnostic imaging, in particular, methods and apparatuses for non-invasive intra-oral dental imaging, with application relating to wireless ultrasound systems, and more particularly for qualitative and quantitative assessment of the tooth-periodontal complex.

BACKGROUND

Periodontal disease is an endemic gum disease showing increasing prevalence with age and affecting up to 90% of the world population. Initiated through accumulation of microbial dental plaque around the teeth within the oral cavity, the disease is credited to the gradual degradation and eventual loss of tooth-supporting connective tissues such as periodontal ligament, cementum and alveolar bone, and detachment of gingiva from the tooth root, forming a pocket. Severe periodontitis results in deepening of pocket between the tooth and gingiva, receding alveolar crest, and eventual tooth loss (edentulism), which occurs in up to 15% of the world's populations according to World Health Organization. Clinical techniques have been developed to assist in periodontal diagnosis and can be categorized into invasive and non-invasive methods.

Periodontal probing is one of the most common invasive methods to measure pocket depth for monitoring periodontal health. For accurate measurement of pocket depth, the periodontal probe must be handled carefully into position and induces stress on the gingival sulcus. The threshold of healthy pocket depth is 3 mm, which is denoted as gingival sulcus. Pocket depths with measurement beyond 3 mm can be attributed to clinical attachment loss or gingival hyperplasia, which can be diagnosed as true periodontal pocket or pseudo-pocket respectively. The periodontal probe can also be used to measure other important clinical parameters such as bleeding on probing and clinical attachment loss. Periodontal probing is usually performed by the dentist or the dental hygienist using a graduated stainless steel probe with a push force equal to 25-35 grams pressure. In reality, this type of probing is highly invasive, uncomfortable to the patient and is subject to high degree of variability. Some reports indicated that the inflammation of gingiva could affect the probe penetration and accuracy. Furthermore, pocket depth measurement does not provide direct assessment of alveolar bone level.

Non-invasive diagnostic methods may be classified into ionizing radiation and non-ionizing methods. Among dental ionizing radiation techniques, intraoral radiography (X-ray) imaging is the most common method used in a dental clinic. There are three configurations: periapical, bitewing, and occlusal radiographs. Periapical radiographs image the entire tooth as well as the surrounding bone around the roots. Bitewing radiographs only image the crown portion of the tooth along with part of the root and alveolar crest, of both the maxillary and mandibular teeth. Occlusal radiographs are used to image any pathology in the soft tissues surrounding the teeth. Radiograph systems are particularly useful in clinical applications by monitoring the progression of periodontitis in respect to the length of the remaining roots with bony support, which cannot be measured by clinical examination. Nevertheless, intraoral radiography, in particular, is limited in its use in periodontal diagnosis related to gingival parameters (bleeding, recession, enlargement) and pocket depth. It is also prone to projection errors and produce two-dimensional images that often result in overlapping anatomical structures. Intraoral radiographs are particularly useful for determining alveolar bone level on the mesial and distal aspects of tooth roots, but do not provide information regarding alveolar bone contour on the buccal or lingual aspects of the teeth. Panoramic radiography is an extra-oral two-dimensional (2D) imaging technique that acquires images of the entire set of teeth but is used only as a screening tool due to its limited diagnostic capability.

Similar to a conventional medical CT scan, cone beam computerized tomography (CBCT) provides fast and accurate three-dimensional (3D) volumetric image reconstruction and visualization of internal anatomical features that 2D intraoral and panoramic images cannot reveal. CBCT is a medical imaging technique that employs the use of X-ray computed tomography; where the radiographic rays are arranged to be purposely diverging with each other, forming a cone. The cone beam is rotated 360 degrees by a C-arm or gantry around the subject and the 3D images of entire volume of the subject are re-constructed from multiple projections. The 3D images from CBCT can be viewed at different planes: sagittal, coronal, and transverse planes. As a relatively new frontier in dental imaging, CBCT is currently being explored extensively as it provides dental professionals with advanced image reconstruction, visualization, and 3D data acquisition, representing a large improvement over traditional 2D techniques. CBCT systems have been used for various dental clinical applications including caries diagnosis in approximal and occlusal lesions, detection and characterization of the bony aspects of periodontal disease, diagnosis of periapical lesions due to pulpal inflammation, visualization of tooth canals, elucidation of internal and external resorption, detection of root fractures in endodontics and orientation and location of impacted teeth. However, CBCT imaging exposes patients to a much higher dose than the intraoral and panoramic radiography. The effective dose for dental CBCT is about 5-70 times more than that of a single film-based panoramic radiograph. Therefore, the use of CBCT should be considered carefully, especially for pregnant women and children as they are more sensitive to radiation. In addition, radiation exposure from repeated imaging to measure progression of bone loss carries a very high radiation risk to patients. The risks are higher for pediatric patients, who have developing organs and longer lifetime for cells to develop cancer. It has been shown that maternal exposures to low levels of dental radiation can lead to premature low-birth weight infants and a risk of cancer and leukemia from excessive exposure dose to radiation. The American Dental Association (ADA) and the Food and Drug Administration (FDA) recommend that clinicians perform dental 3D and 2D imaging, only when necessary for the diagnosis of disease and should limit the field of view to the area of interest; to avoid redundant radiation exposure to the patient (FDA website). The other concerns, besides the increased radiation dose for the use of CBCT, include the increased effect of scatter radiation that distorts the imaging of soft tissues and the presence of metal artifacts caused by metallic implants and crowns. Finally, patient motion artifact also leads to CBCT image degradation and poor image quality. These above said limitations preclude the use of CBCT as an imaging method for routine dental examination in diagnosis and treatment planning.

It is, therefore, desirable to provide a device/apparatus/system/method/process that overcomes the shortcomings of the prior art.

SUMMARY

A method and apparatus for wireless ultrasound imaging is provided.

Ultrasound imaging is a non-invasive and non-destructive technique used in many fields, especially in medicine and engineering. The emission of high-frequency source pulse and the detection of the echoes are accomplished by a transducer. The characteristics of the returning echoes are mainly governed by the elastic properties of the transmitting medium and the acoustic impedance contrast between the media. In recent years, ultrasound has been utilized to study the elastic properties of bony hard tissues. The bone/soft-tissue interface is a strong reflector of ultrasound energy, thus making bone-tissue imaging possible. In order to calculate the thickness of a hard tissue; in which the speed of ultrasound is different from the soft tissue, a correction factor is required. The following equations explain the theory to calculate the correction factor.

In some embodiments, a method can be provided for producing an ultrasonic image for the tooth-periodontium complex. The method can comprise: (a) providing a probe, the probe comprising at least one array of ultrasonic transducers; (b) transmitting an ultrasonic signal from at least one of the transducers and receiving at least a portion of the ultrasonic signal from at least one of the transducers; (c) employing a central processing unit; (d) displaying the ultrasound images in a portable device via wirelessly.

In some embodiments, a method can be provided for producing an ultrasonic image at different angles. The method can comprise: (a) providing a probe, the probe includes rotation mechanism which can rotate at angle from 0° to 90°; (b) the probe can comprise a tilt mechanism which is able to bend the probe head from a range of 0° to 180°.

In some embodiments, an apparatus can be provided, comprising: an ultrasonic probe further comprising a coupling cushion, ultrasound gel pad, which can further comprise a coupling medium. The apparatus can further comprise low ultrasonic attenuation at high frequency, wherein the apparatus can be designed and constructed to be insertable in a mouth safely (biocompatible). In some embodiments, the apparatus can be disposable.

In some embodiments, the apparatus can comprise a switch button on the probe to control the image acquisition and can further comprise a pedal switch. In some embodiments, the switch button and pedal switch can communicate with the acquisition system either via wire or wirelessly to control image acquisition.

In some embodiments, the apparatus can provide a two-dimensional image. In some embodiments, the image can depict oral features such as gum, alveolar bones, teeth, and nerve canals of the upper and lower jaws at the facial and lingual (facing the tongue) surfaces.

In some embodiments, the apparatus can provide images that can quantitatively calculate longitudinal thickness of alveolar bone and the crestal alveolar bone, map the gingival height and gingival thickness surrounding a tooth.

In some embodiments, the apparatus can provide images that can measure, and map longitudinal changes in bone dehiscence and fenestration surrounding any or all teeth.

In some embodiments, the apparatus can provide images that can measure and map the alveolar bone height from the incisal edge, gingival margin, cementoenamel junctions (CEJ) surrounding a tooth.

In some embodiments, the apparatus can provide images that can measure and map the enamel thickness, dentin thickness of a tooth.

In some embodiments, the apparatus can provide images that can measure and map the cementoenamel junction, clinical and anatomical crown height of a tooth.

In some embodiments, the apparatus can provide images that can measure and map pseudo-periodontal pocket (measuring from gingival margin to bottom of the pocket), true periodontal pocket (measuring from gingival margin to cementoenamel junction and cementoenamel junction to the bottom of the pocket) surrounding a tooth.

In some embodiments, the apparatus can provide images that can map bone dehiscence and bone fenestration around a tooth root.

In some embodiments, the apparatus can provide images that can measure and map the width of mid palatal suture of a tooth.

In some embodiments, the apparatus can provide images that can map the location of every and all intra-oral foramina of a tooth.

In some embodiments, the apparatus can provide images that can map gingival abscess, periodontal abscess and acute alveolar abscess and periapical abscess surrounding a tooth.

In some embodiments, the apparatus can provide images that can be displayed in a smart device using wireless communication protocols, including one or both of Wi-Fi® and Bluetooth®.

Broadly stated, in some embodiments, an apparatus can be provided for imaging an oral structure of upper and lower jaws at facial and lingual surfaces of a patient, the apparatus comprising: an ultrasound probe comprising an array of piezoelectric transducer crystals operating at an ultrasonic frequency of at least 20 megahertz; a probe tip configured for housing the array of crystals, the probe tip configured for rotating and bending; a gel pad comprising one or both of polymer and hydrogel configured to be disposed on the probe tip and positioned between the array of crystals and the oral structure; a battery; and a control switch configured for controlling the operation of the apparatus.

Broadly stated, in some embodiments, the apparatus can further comprise a handle, the probe tip rotatably attached to the handle.

Broadly stated, in some embodiments, the gel pad can comprise low ultrasonic attenuation at the ultrasonic frequency and is safe for use in the oral cavity of the patient, the gel pad configured to cover the array, the gel pad further configured to be shaped to conform to the oral structure to be imaged.

Broadly stated, in some embodiments, the apparatus can further comprise an ultrasound data acquisition unit, the acquisition unit comprising: a microcontroller or digital signal processor or an application specific integrated circuit ("ASIC") operatively coupled to the array and configured to control ultrasound signal generation, ultrasound signal acquisition, processing of acquired ultrasound signals and communication of the acquired ultrasound signals; and a wireless communications transceiver module operatively coupled to the microcontroller or digital signal processor or ASIC, the transceiver module configured to wirelessly transmit the acquired ultrasound signals to a peripheral smart device comprising a visual display.

Broadly stated, in some embodiments, the apparatus can further comprise a control foot pedal configured for wireless communication with the transceiver module, the foot pedal configured to control the operation of the apparatus.

Broadly stated, in some embodiments, the transceiver module can be configured to communicate using one or more of Bluetooth®, Wi-Fi®, Wi-Fi Direct® and ZigBee® communications protocols.

Broadly stated, in some embodiments, the microcontroller or digital signal processor or ASIC can be configured to multiplex ultrasound signals transmitted to the array.

Broadly stated, in some embodiments, the microcontroller or digital signal processor or ASIC can further comprise an analog-to-digital converter configured to digitize ultrasound signals received from the array.

Broadly stated, in some embodiments, the peripheral smart device can comprise one or more of a general purpose computer, a personal digital assistant, a smart phone, a smart television and a computing tablet.

Broadly stated, in some embodiments, the peripheral smart device can comprise an iOS® or Android® operating system.

Broadly stated, in some embodiments, the acquisition unit can comprise a battery management circuit.

Broadly stated, in some embodiments, the peripheral smart device can comprise a memory further comprising software code segments configured to cause the peripheral smart device to carry out one or more steps comprising of: enhancing ultrasound signals representing images of alveolar bone structure and boundaries of enamel, dentin and gingiva of the patient using a noise removal filter, a contrast enhancement, an edge enhancement, and machine learning; identifying peaks and troughs of one or more of cementoenamel junctions, alveolar bone crests and gingival sulcus of the patient using object detection and recognition; calculating changes in bone level or pocket depth of the patient using measurements between ultrasound images of different periods; comparing the ultrasound images of the patient with one or more of CBCT images of the oral structure and enhancing visualization of soft and hard tissues of the oral structure; eliminating artifacts caused by multiple reflections of ultrasonic waves in the ultrasonic images of the oral structure; calculating ultrasonic velocity for the hard tissues of the patient; and correcting the detected thickness of the alveolar bone of the patient.

Broadly stated, in some embodiments, the software code segments can be configured to cause the peripheral smart device to carry out the step of detecting boundary and segments of the oral structure using one or more of multi-label graph cut optimization approach, contrast enhancement and a homomorphic filter.

Broadly stated, in some embodiments, the software code segments can be configured to cause the peripheral smart device to carry out the step of extracting interest landmarks of the oral structure using a combination of region extraction, edge detection, local maximum and/or local minimum localization and one or more of adaptive median filtering, homomorphic filtering, and contrast enhancement.

Broadly stated, in some embodiments, the software code segments can be configured to cause the peripheral smart device to carry out the step of measuring changes of the oral structure over a period of time using the measurements from ultrasound images of different periods of time.

Broadly stated, in some embodiments, the software code segments can be configured to cause the peripheral smart device to carry out the step of fusing the ultrasound images of the oral structure with one or more of CBCT images of the oral structure using a combination of region extraction, edge detection, probability-based set registration, and one or more of adaptive median filtering, homomorphic filtering, and contrast enhancement.

Broadly stated, in some embodiments, the software code segments can be configured to cause the peripheral smart device to carry out the step of predicting and removing the multiple reflections artifacts.

Broadly stated, in some embodiments, the software code segments can be configured to carry out the step of calculating the ultrasonic velocity.

Broadly stated, in some embodiments, the software code segments can be configured to carry out the step of correcting the detected thickness.

BRIEF DESCRIPTION OF THE DRAWINGS

FIG. 3 is an illustration depicting the penetration of ultrasound into hard tissue.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment can also be included in other embodiments but is not necessarily included. Thus, the present technology can include a variety of combinations and/or integrations of the embodiments described herein.

A method and apparatus for wireless ultrasound imaging is provided for qualitative and quantitative assessment of dental conditions and, in particular, the tooth-periodontal complex.

Figure 1A:
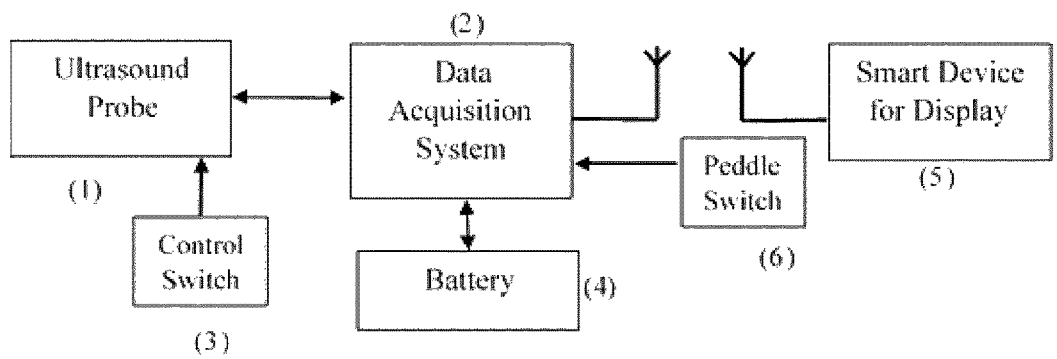
FIG. 1A is a block diagram depicting one embodiment of an apparatus for wireless portable ultrasound imaging.
Figure 1B:
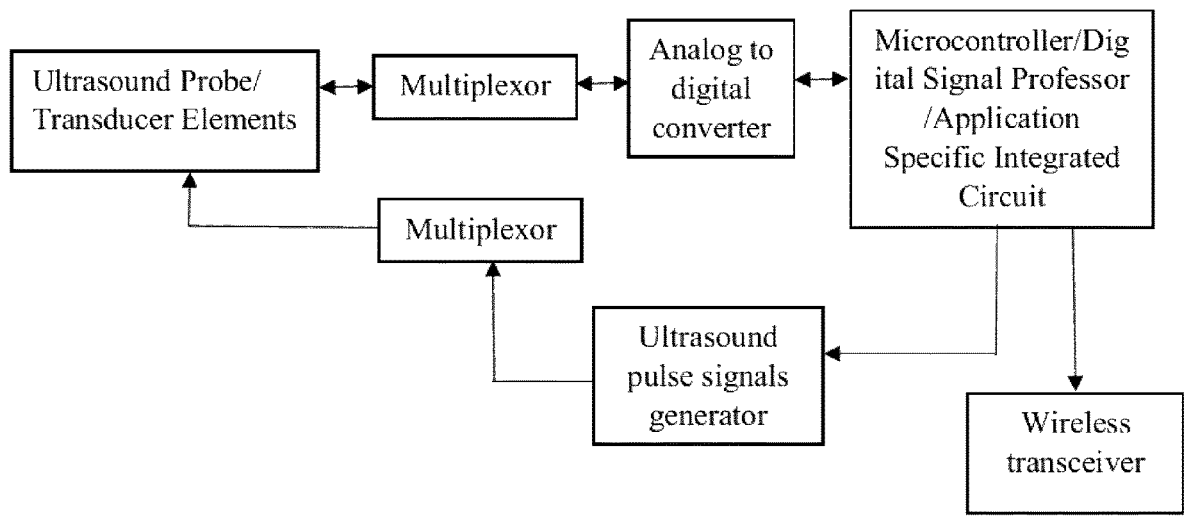
FIG. 1B is a block diagram depicting another embodiment of the apparatus of FIG. 1A.

Referring to FIG. 1A, one embodiment of wireless ultrasound imaging apparatus 100 is shown. In some embodiments, apparatus 100 can comprise ultrasound probe 1 operatively coupled to data acquisition system 2. In some embodiments, probe 1 can comprise control switch 3 disposed thereon for controlling the operation of probe 1. In some embodiments, probe 1 can comprise any high frequency model of ultrasound probe as manufactured by Clarius of Burnaby, British Columbia, Canada. In other embodiments, probe 1 can comprise a customized ultrasound probe. In some embodiments, probe 1 can comprise an array of 1×128 ultrasound piezoelectric transducer crystals in a spaced-apart configuration wherein the array comprises a crystal spacing of 0.1 mm on centre whereby the array comprises a width of 12.8 mm. In some embodiments, data acquisition system 2 can be operatively coupled to battery management system 4 configured to provide electrical power to data acquisition system 2, wherein battery management system 4 can comprise a lithium battery 4a. In some embodiments, data acquisition system 2 can comprise a wireless transceiver and antenna to enable wireless communication with smart device 5, which can further comprise a video display for visually displaying data received from data acquisition system 2. In some embodiments, data acquisition system 2 can further comprise foot pedal switch 6 operatively coupled thereto to enable control of data acquisition system 2 by an operator. Smart device 5 can comprise one or more of a personal computer, a computing tablet, a smart phone and any other electronic computing device capable of wireless communication with other computing devices or a worldwide computing network as well known to those skilled in the art. In other embodiments, data acquisition 2 can comprise of an analog to digital converter, an ultrasound pulse signal generator and two multiplexors, as shown in FIG. 1B.

Figure 4A:
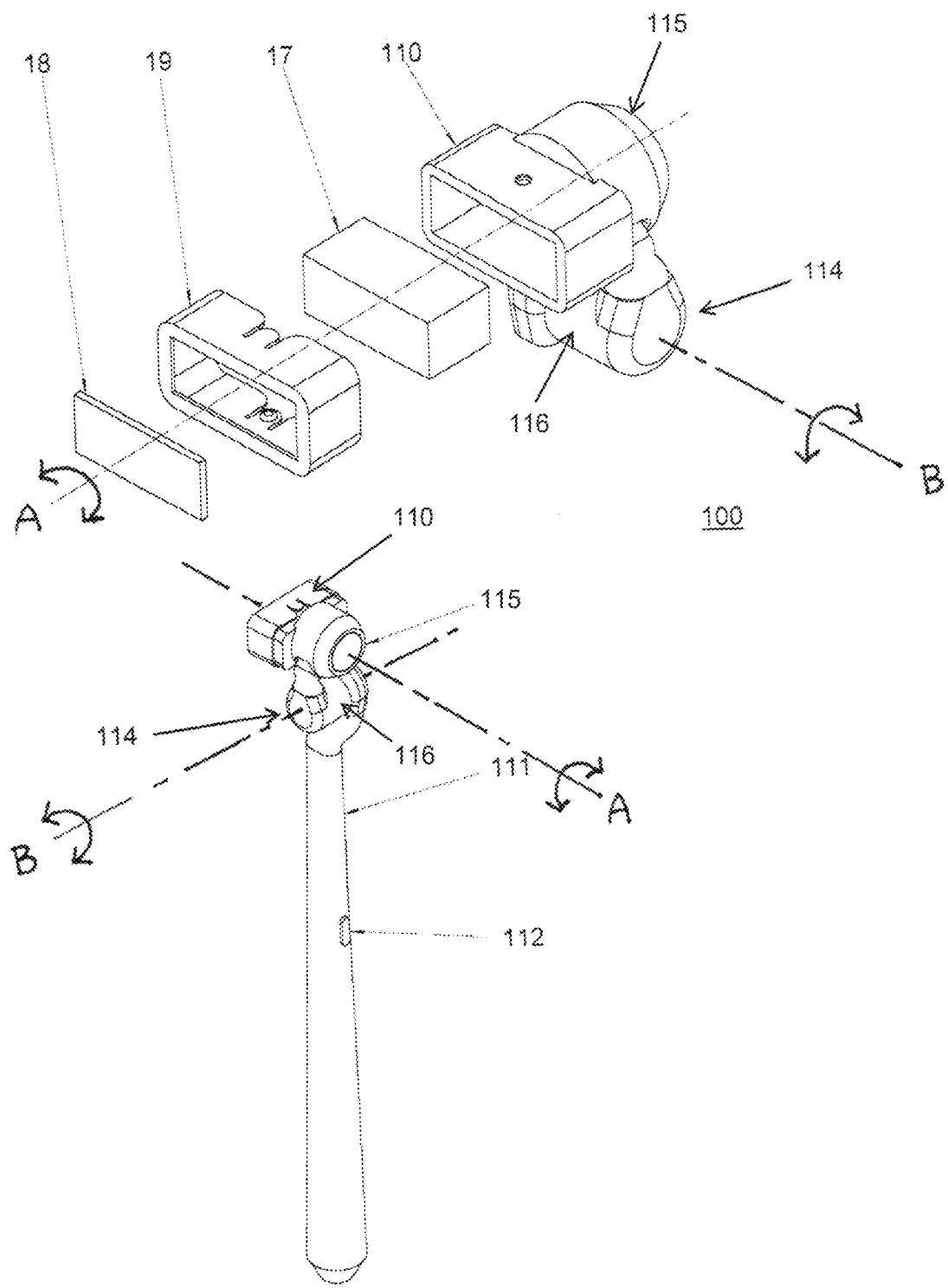
FIG. 4A is a perspective view depicting one embodiment of an ultrasound probe.

In some embodiments, apparatus 100 can comprise wireless portable ultrasound acquisition system 2 for dental imaging, comprising an ultrasound probe 1 with a control switch 3, which can be connected through a cable to a portable ultrasound acquisition system that can communicate with a smart tablet or a phone display 5 wirelessly using one or both of Wi-Fi Direct® or Bluetooth®, to display the ultrasound images. The control switch can be used to turn on/off the image acquisition. In addition, pedal 6 can also connect to the ultrasound acquisition system to control image acquisition. In some embodiments, the ultrasound acquisition unit can comprise battery 4, and can be configured to operate in emission and reception. The ultrasound probe can operate at a minimum frequency of 20 MHz and can comprise a small scale multi-array transducer 17 with matching layer as shown in FIG. 4A. A layer of hydrogel 18 can also be incorporated to act as a delay line between the transducer and gum as shown in FIG. 4A.

Figure 2:
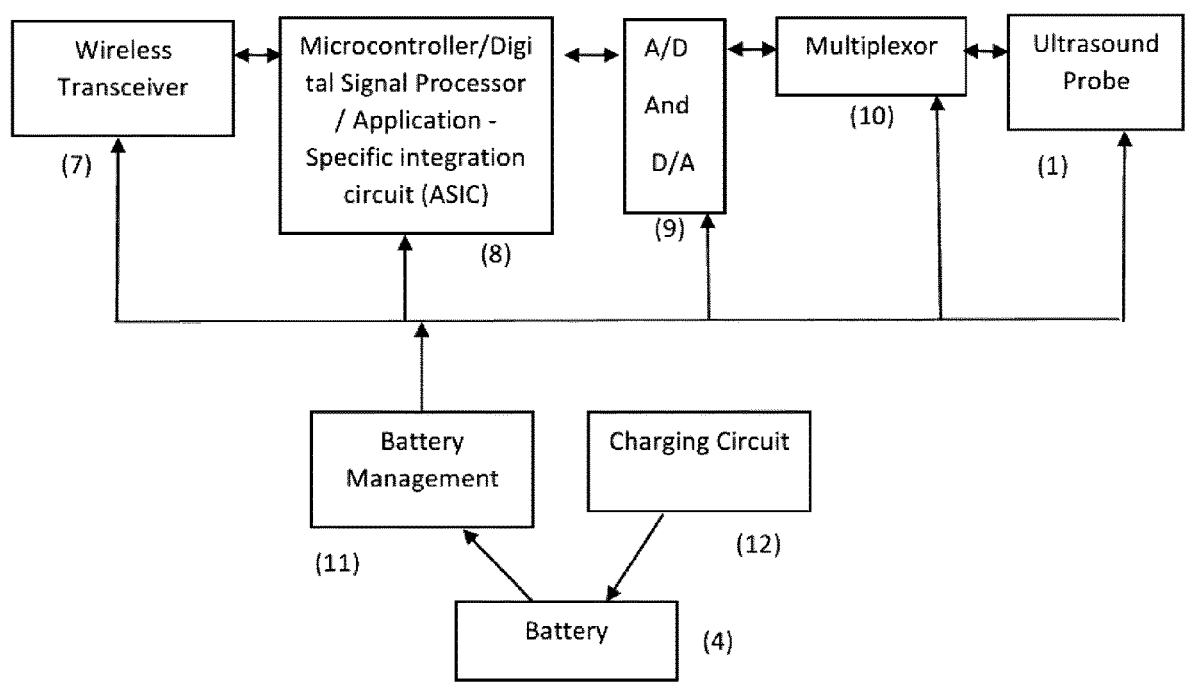
FIG. 2 is a block diagram depicting another embodiment of a data acquisition system for use with the apparatus of FIG. 1A.

Referring to FIG. 2, one embodiment of an acquisition system for use with apparatus 100 can comprise of a microcontroller or digital signal processor or an application-specific integrated circuit ("ASIC") 8 that can generate the ultrasound signals to the probe through D/A converter 10 to multiplexor 9. When the ultrasound signal receives from the probe, it will pass through the multiplexor to a A/D converter and then into the microcontroller or digital signal processor or ASIC. Wireless transceiver 7 can communicate with a smart tablet or a phone display 5 wirelessly using one or both of Wi-Fi Direct® or Bluetooth®, to display the ultrasound images. Battery management circuit 10 can convert the battery power to provide the voltage to the ultrasound apparatus. In some embodiments, recharging circuit 11 can be integral to apparatus 100 to recharge the battery.

Referring to FIG. 3, part (a) illustrates ultrasound penetrating a hard tissue with the speed of ultrasound $\upsilon$. Part (b) illustrates the differences on the hard tissue when the speed of ultrasound is $\hat{\upsilon}_s$ instead of $\upsilon$. Let ultrasound beam incident normally on a plate with thickness h and speed of ultrasound, (FIG. 3, part (a)). The thickness and the speed are related by the equation: h=$\upsilon$×t/2, where, t is the time taken for ultrasound to traverse the thickness up and down the plate. If the ultrasound scanner uses a different speed, say, $\hat{\upsilon}_s$, then a different thickness, $\hat{h}$, will be determined; i.e., $\hat{h}=\hat{\upsilon}_s \times$ t/2. Taking the ratio of two thicknesses yields:

$$\frac{\hat{h}}{h} = \frac{\hat{v}_s}{v} \quad (1)$$

Consider a segment, $\hat{l}$, measured from the ultrasonograph (FIG. 3, part (b)). Its length has been distorted due to $\hat{v}_s$ used different from $v$. The speed-corrected length, $l_c$, which estimates the actual length, $l$, is:

$$l_c = C \times \hat{l} \quad (2)$$

where:

$$C = \sqrt{sin^2\theta + \left(\frac{v}{v_s}\right)^2 cos^2\theta} \quad (3)$$

is the correction factor and $\theta$ is the acute angle $\hat{l}$ makes with the direction perpendicular to the plate (or the direction parallel to the ultrasound beam). The behavior of C in terms of $\theta$ is shown (FIG. 3, part (c)).

In some embodiments, apparatus 100 can provide a portable and an improved ultrasonic imaging system constructed to facilitate imaging the tooth-periodontium complex, qualitative and quantitative assessment of the tooth-periodontal structures of a dental client or a pet animal, in a non-invasive manner.

Figure 4B:
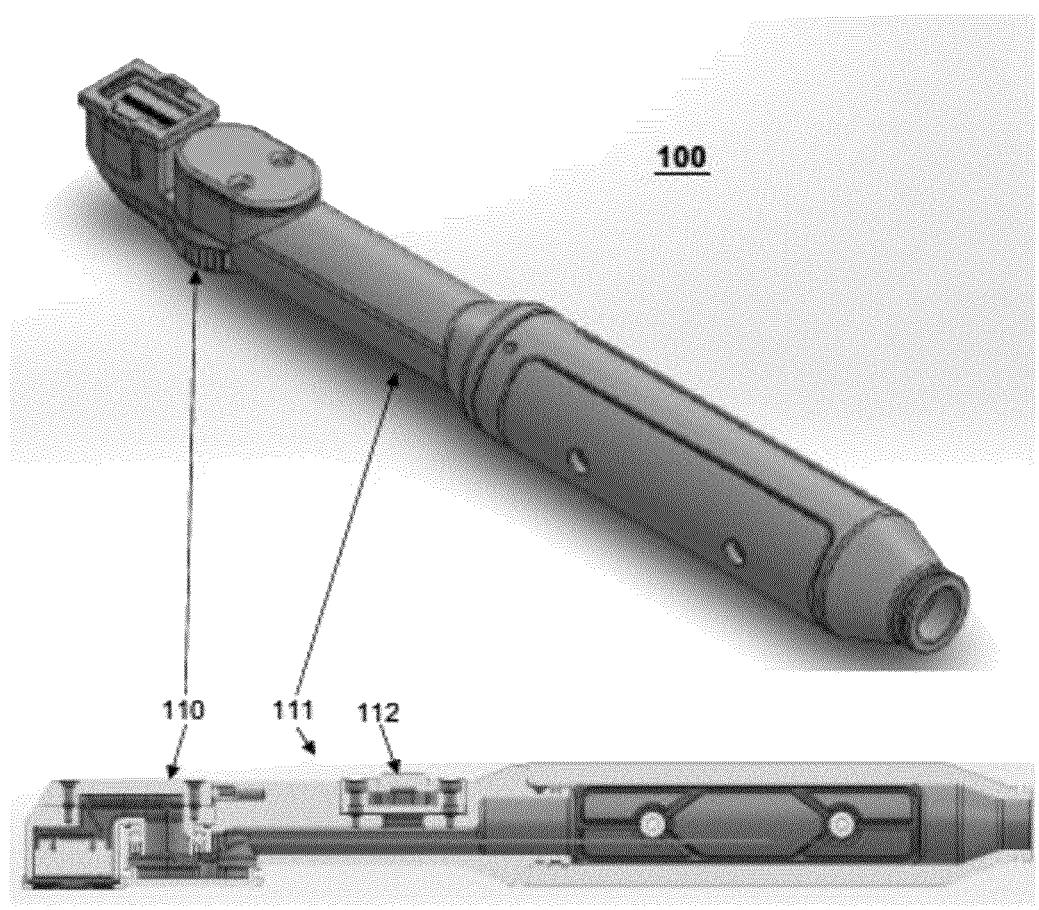
FIG. 4B is a perspective view depicting another embodiment of the ultrasound probe of FIG. 4A.
Figure 5:
FIG. 5 is a perspective view depicting one embodiment of a wireless portable ultrasound imaging apparatus.

Referring to FIGS. 4A and 4B, embodiments of apparatus 100 are shown, which can comprise an ergonomic probe fitting within a mouth of a patient. In some embodiments, the probe can comprise small scale multi-array transducer 17, disposable gel pad (polymer/hydrogel) 18 with sleeve clip 19 to act as a delay line between the transducer and the gum. Probe head 110 can also comprise tilt mechanism 114 configured for rotation and tilt, for easy reach to all areas of the mouth and switch 112, which can be disposed on ergonomic handle 111, which can be used to control image acquisition. In some embodiments, tilt mechanism 114 can comprise probe head 110 operatively attached to rotating joint 115 that can rotate about axis A. In some embodiments, tilt mechanism can further comprise rotating joint 116 disposed between rotating joint 115 and handle 111, wherein rotating joint 116 can rotate about axis B, and wherein axis A is not parallel to axis B, thereby enabling the ability for said rotation and tilt. In some embodiments, apparatus 100 can comprise ultrasound acquisition system 2, which can further comprise a central processing unit (CPU), a pulser, an analog-to-digital converter, a wireless transceiver, which can comprise one or both of Wi-Fi® and Bluetooth® capability, a cable can connect the probe to the ultrasound acquisition system 2. Apparatus 100 can further comprise battery 4 so that the unit can be portable. In some embodiments, apparatus 100 can comprise display unit 5, which can comprise a smart tablet, laptop, smart phone, or smart display with one or both of Wi-Fi and Bluetooth capabilities. In some embodiments, apparatus 100 can comprise pedal switch 6, which can be connected to data acquisition unit 2, either via wire or wireless to control image acquisition.

In some embodiments, smart device 5 can comprise a memory further comprising a processor and a memory further comprising software code segments configured to cause the smart device to carry out one or more processes on ultrasonic images obtained by apparatus 100 as described herein.

Noise Removal

Figure 15:
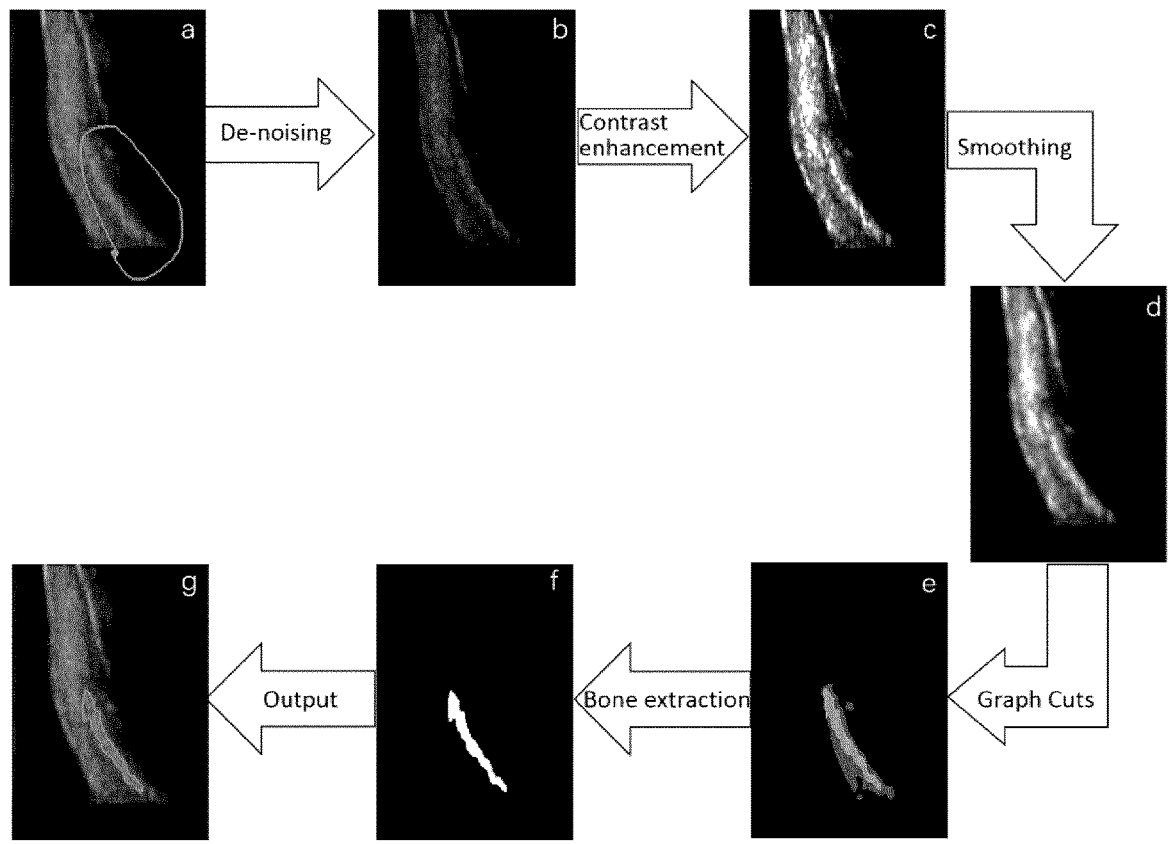
FIG. 15 is an image flowchart depicting an example of semi-automatic alveolar bone segmentation in ultrasound image using graph cut using one embodiment of a segmentation process: (a) Drawing a region (in yellow color) to determine the region of interest (ROI) on the original ultrasound ("US") image, (b) after de-noising using homomorphic filtering, (c) with contrast enhancement, (d) after smoothing using Gaussian filtering, (e) multi-label graph cuts segmentation in ROI, (f) alveolar bone extraction, and (g) final result showing delineation (in orange color) of alveolar bone boundary in the original US image.

In some embodiments, smart device 5 can comprise software code segments configured to cause the smart device to enhance ultrasound signals representing images of alveolar bone structure and boundaries of enamel, dentin, and gingiva of a patient. To accomplish this, there are different noise filtering techniques for ultrasound imaging that can be used as linear filtering (such as Gaussian filter) and nonlinear filtering (such as adaptive median filtering and homomorphic filtering):

Gaussian filter is a convolution operation that can be applied to each image pixel with a 2×2 Gaussian kernel to remove high-frequency noises (example in FIG. 15).

The adaptive median filter can operate in a rectangular window area $S_{xy}$ that can be centered on the pixel (x,y). The output of the adaptive median filtering is a new value as a replacement to the value of the pixel at (x,y) for each window-filtering time. Adaptive median filter can remove noise while keeping edges relatively sharp.

The homomorphic filtering is a process that can comprise of three stages: (i) calculating the Fourier transform of the logarithmic compressed image, (ii) applying high-pass filter function and (iii) constructing the inverse Fourier transform of the image. As a result, the homomorphic filtering can normalize the brightness across the image and enhances contrast. In the homomorphic filtering process, the filter is typical in circularly symmetric curve shape, centered at (0,0) coordinates in the frequency domain. Here, a Gaussian high-pass filter can be used to build homomorphic function.

Contrast Enhancement

Figure 6:
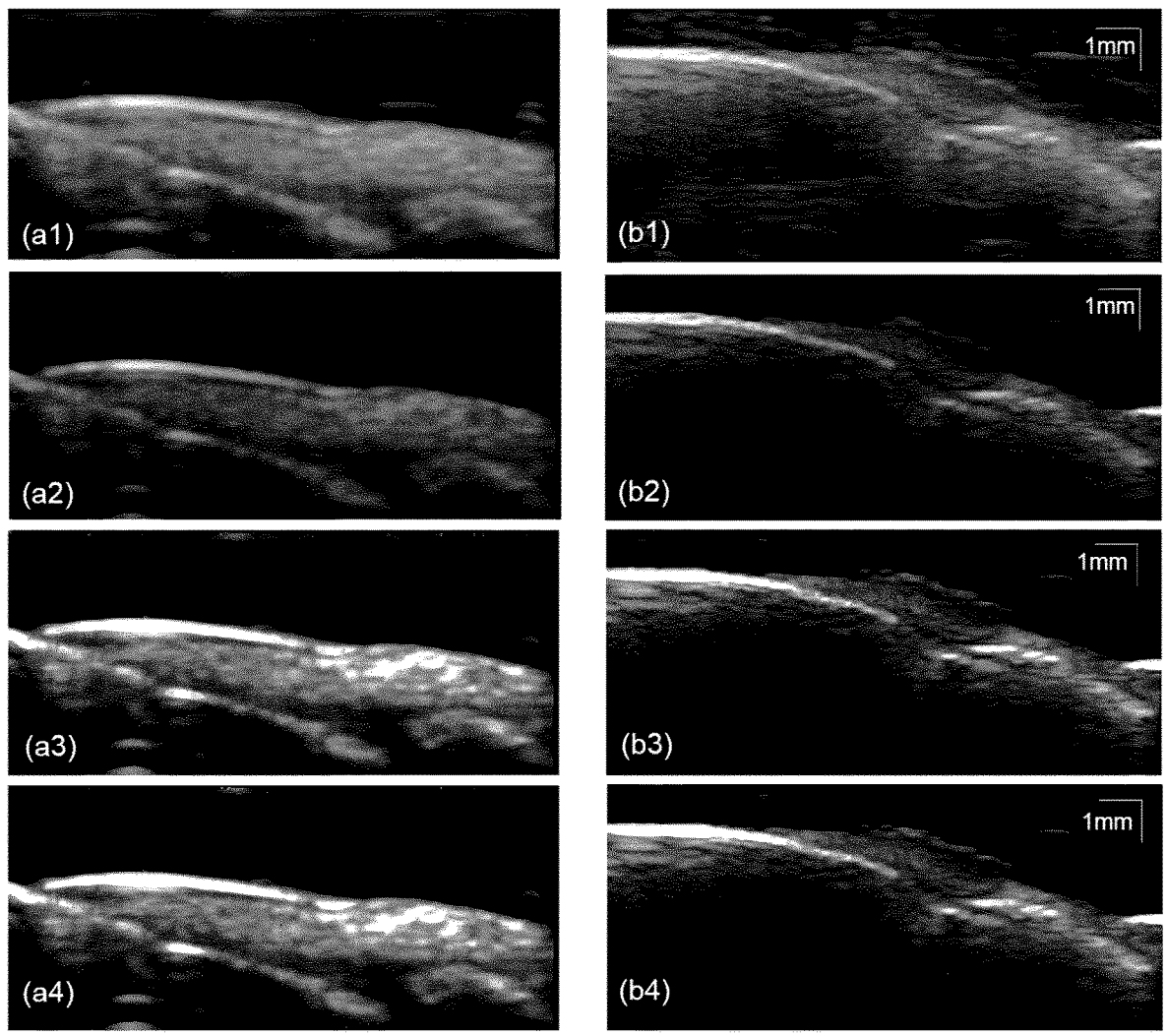
FIG. 6 is a series of 8 images depicting image preprocessing steps for in-vitro (a) and for in-vivo data (b). (1) Original image; (2) after use of homomorphic filter; (3) after homomorphic filtering and contrast enhancement; (4); after homomorphic filtering, contrast enhancement, and use of adaptive median filter.

Due to the inherent properties of ultrasound images and an approximate selection of the initial region, the region of interest ("ROI") is inhomogeneous and has low contrast. The reflection from alveolar bone is scattered by the rough surfaces and the corresponding bone boundary is less focused and blurred. Therefore, a linear contrast enhancement approach was applied to enhance the contrast of the images by expanding the original intensity values of the image linearly, thus allowing a better detection of the bone boundary. An example of a noise removal and contrast enhanced image is given in FIG. 6.

Figure 7:
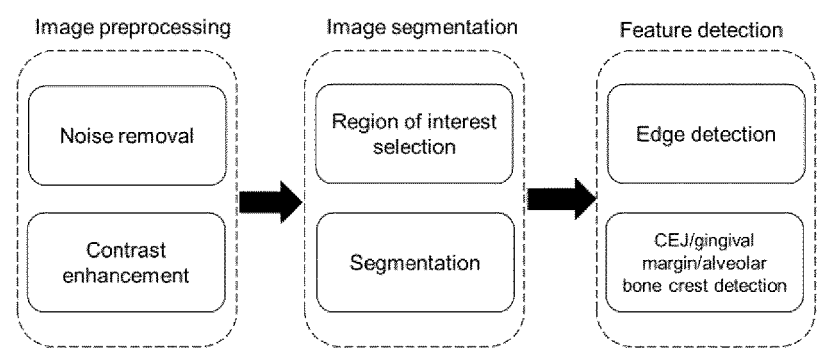
FIG. 7 is a block diagram depicting one embodiment of a semi-automated process to identify CEJ gingival margin and alveolar bone crest.

In some embodiments, smart device 5 can comprise software code segments configured to cause the smart device to identify peaks and troughs of one or more of cementoenamel junctions ("CEJ"), gingival margin and alveolar bone crests of a patient using object detection and recognition. FIG. 7 illustrates one embodiment of a semi-automated process to identify CEJ, gingival margin and alveolar bone crests.

Image Preprocessing

As described above, image enhancement can be accomplished using noise removal with one or more of Gaussian filter, adaptive median filter, homomorphic filtering, and contrast enhancement.

Image Segmentation Using Multi-Label Graph Cut

To obtain an accurate and reproducible detection of the CEJ location, an initial approximate region of interest consisting of the CEJ and part of enamel and cementum was manually selected and utilized in the proposed approach. A K-means clustering can be used for the identification of foreground and background regions within the initial region of interest. The K-means (K=2) was used to set two pre-classified labels and build the initial graph, since using all of the pixels as the reference for segmentation may slowdown the execution. K-means partition pixel intensities into two initial clusters based on the similarity to the clustering centers. The centers were adjusted based on the average intensity of pixels. This step was repeated until convergence had been reached.

Edge Detection and Enhancement

Edges are important for differentiating various types of tissues (gingiva, bone, enamel) in an image. The strength of the edges is calculated by intensity gradient or the change in intensity in the direction of steepest ascent. Edge enhancement can be done with the convolution using first order derivative kernels (Sobel kernel, Canny kernel) or second order derivatives (Laplacian kernel, Log filter).

Feature Selection

After clustering the region using graph cut segmentation, the function extracts every point in the foreground region, and then detects the edge corresponding to the upper border of the enamel, cementum and alveolar bone. Since enamel, cementum, and alveolar bone are strong ultrasound reflectors, their intensities are very high in comparison with gingiva thus easy to detect. Based on the small V-shaped characteristic of CEJ/gingival margin/alveolar bone crest, our method calculates the absolute value of change along the vertical coordinate axis and then compares to the location of the previous point; the point with largest absolute value of change is seen as CEJ CEJ/gingival margin/alveolar bone crest. In other words, for the upper line of n elements u(i) with $i=\overline{1,n}$, the differential was estimated as $$u'(i) = \begin{cases} 0, i = 1 \\ u(i) - u(i-1), i = \overline{2,n} \end{cases}$$

Figure 8:
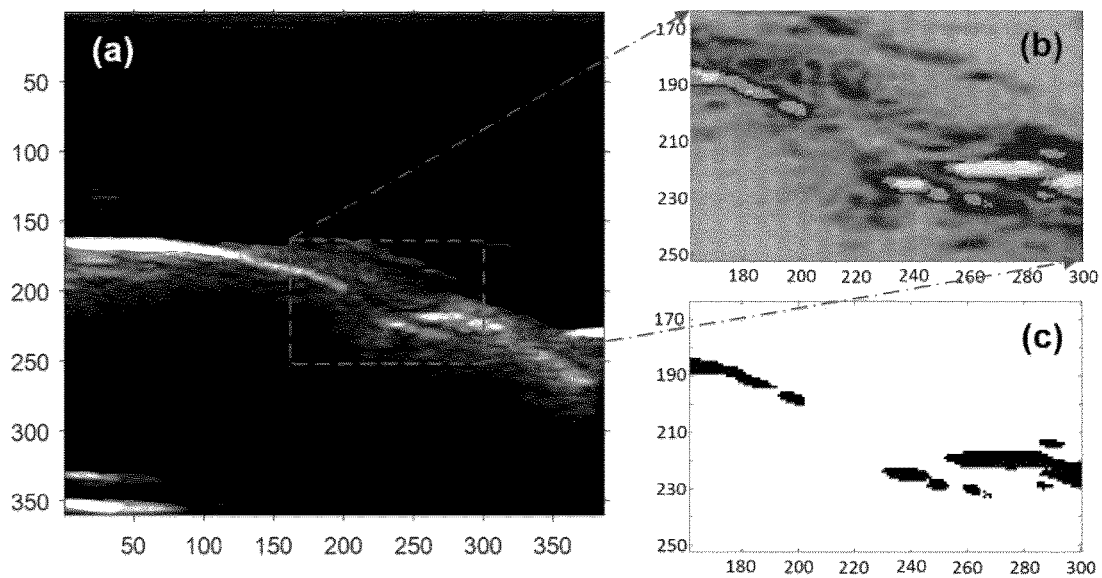
FIG. 8 is a series of 3 images depicting one embodiment of region extraction for: (a) Select region manually; (b) corresponding RGB image; (c) region extraction using k-mean clustering.
Figure 9:
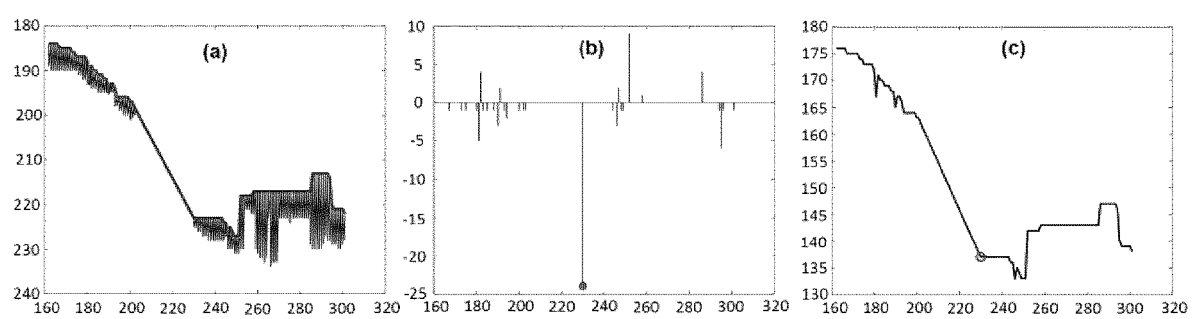
FIG. 9 is a series of 3 images depicting one embodiment of CEJ identification process for: (a) Edge detection; (b) local difference calculation; (c) CEJ identification at maximum difference.
Figure 10A:
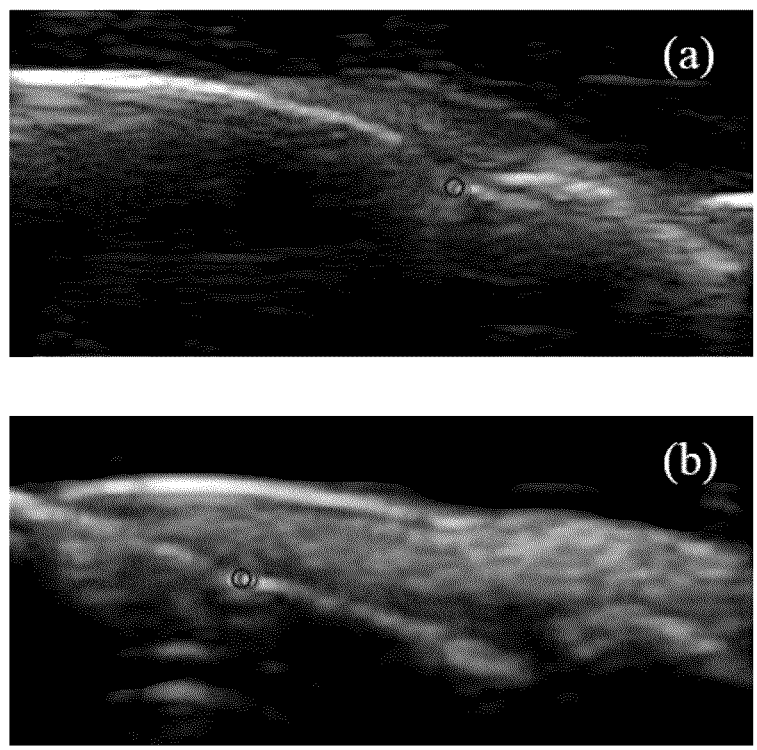
FIG. 10A is a series of 2 images depicting a comparison of CEJ CAL method (red circle) and manual CEJ identification (blue circle) on (a) in-vitro and (b) in-vivo data.

From that, the CEJ/gingival margin/alveolar bone crest was selected as corresponding to the maximum absolute $|u'(i)|_{max}$ of the differential. Finally, transforming the pixel location from coordinate into the original image, the result of the function marks the CEJ/gingival margin/alveolar bone crest in the original image. FIG. 8 illustrates an example of region extraction. FIG. 9 illustrates an example of CEJ identification process. FIG. 10A illustrates an example of comparing CEJ CAL method and manual CEJ identification on in-vitro (part (a)) and in-vivo data (part (b)).

Figure 10B:
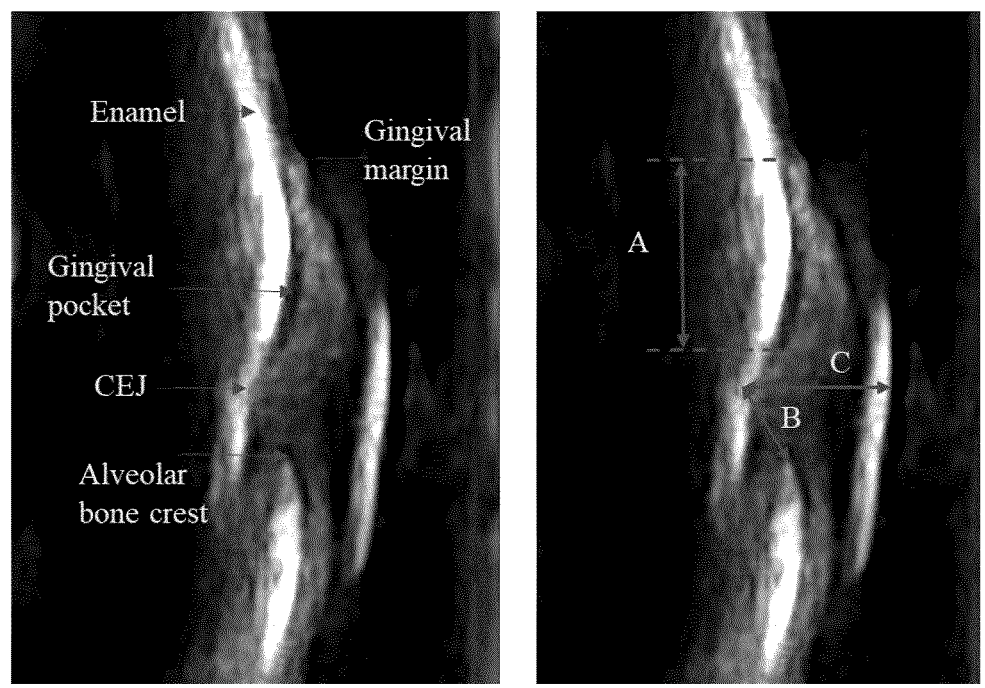
FIG. 10B is a series of 2 images depicting an example of measuring pocket depth (A), alveolar bone level to the CEJ (B), or gingiva thickness at the CEJ (C) in a human ultrasound image.

In some embodiments, calculating changes in pocket depth (A), alveolar bone level to the CEJ (B), or gingiva thickness at the CEJ (C) of the patient (as shown in FIG. 10B) can be done using measurements between ultrasound images of different periods of time.

In some embodiments, smart device 5 can compare the ultrasound images of a patient with one or more of CBCT images, and/or MRI images of the oral structure and enhancing visualization of soft and hard tissues of the oral structure by means of Coherence Point Drift ("CPD") registration.

Region-Growing Segmentation

This method is a common and effective approach for image segmentation. The user specifies a seed point inside the object to be segmented. Consider a pixel f as a seed point with an intensity $I_f$. The pixels neighboring f are evaluated to determine if they should also be considered part of the object. To do so, a tolerance, ±t, is set for the lower and upper limit. The "flood fill" region-growing algorithm will add a neighboring pixel q to the pixel f's region if $I_q$ is inside the interval $[(I_f-t), (I_f+t)]$. The process is repeated recursively for the other neighbors of f to expand from the seed pixel to a coherent region.

Coherence Point Drift (CPD) Registration

Figure 11:
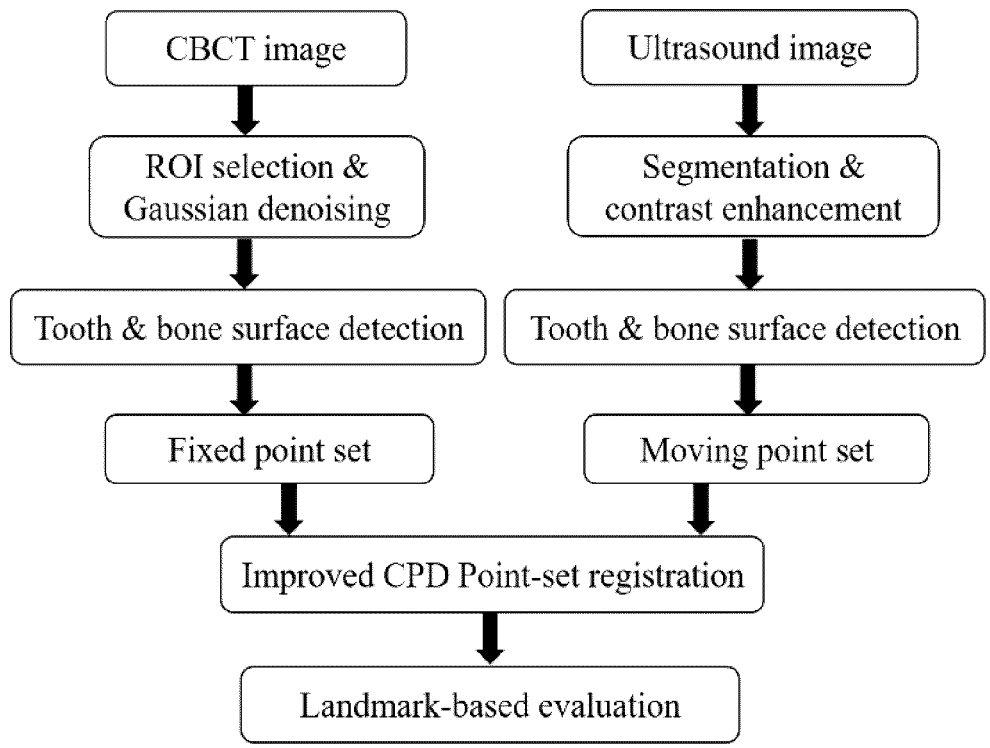
FIG. 11 is a block diagram depicting a flowchart of one embodiment of an ultrasound-CBCT image registration process.

The method considers the alignment of two point sets as a probability density estimation problem. By maximizing the likelihood, the CPD can fit the Gaussian mixture model ("GMM") centroids of the moving point set to the fixed point set. The GMM probability density function, p, is $$p(x) = \omega \frac{1}{N} + (1-\omega) \sum_{m=1}^{M} \frac{1}{M} p(x|m)$$

$$\text{where } p(x|m) = \frac{1}{(2\pi\sigma^2)^{D/2}} \exp^{\frac{\|x-y_m\|}{2\sigma^2}},$$

where D is the dimension of the point sets, N and M are the number of points in the point sets, and the weight, w (0≤w≤1)), provides a flexible control in the presence of severe outliers and missing points. In the rigid registration, the coherence constraint was imposed by re-parameterization of GMM centroid locations with rigid parameters and derive a closed form solution of the maximization step of the expectation-maximization ("EM") algorithm in arbitrary dimensions. The EM algorithm used for optimization of the likelihood function can comprise of two steps: E-step to compute the probabilities and M-step to update the transformation. Another advantage of the CPD is that it can preserve the topological structure of the point sets because the GMM centroids are moved coherently as a group. FIG. 11 illustrates one embodiment CPD registration between ultrasound and CBCT images. FIG. 11 shows a flow chart of the image registration process. The CBCT images can first be processed by adaptive low-pass Wiener filter to remove the white Gaussian noise. A side-tracing strategy can be employed to identify the points, which have the maximum intensity difference between adjacent pixels along each row from left to right, to be selected as the surfaces of the tooth and bone. The detected surface can be curve-fitted to remove outliers. The set of points thus obtained can be used as a reference or fixed-point set. For ultrasound images, the regions for the hard tissues can be extracted from the images by a region growing segmentation method. Then, the local contrast of the extracted images can be adaptively enhanced. In the next step, the tooth and bone surfaces from the ultrasound images can be determined when searching the largest intensity pixels along each row. Similar to CBCT, the detected surfaces in ultrasound images can be curve-fitted to remove outliers. The set of points thus obtained can be used as a moving point set. Cubic curve fitting can be used for both CBCT and ultrasound images.

An Example of Coherence Point Drift Registration Between US and CBCT

Figure 12A:
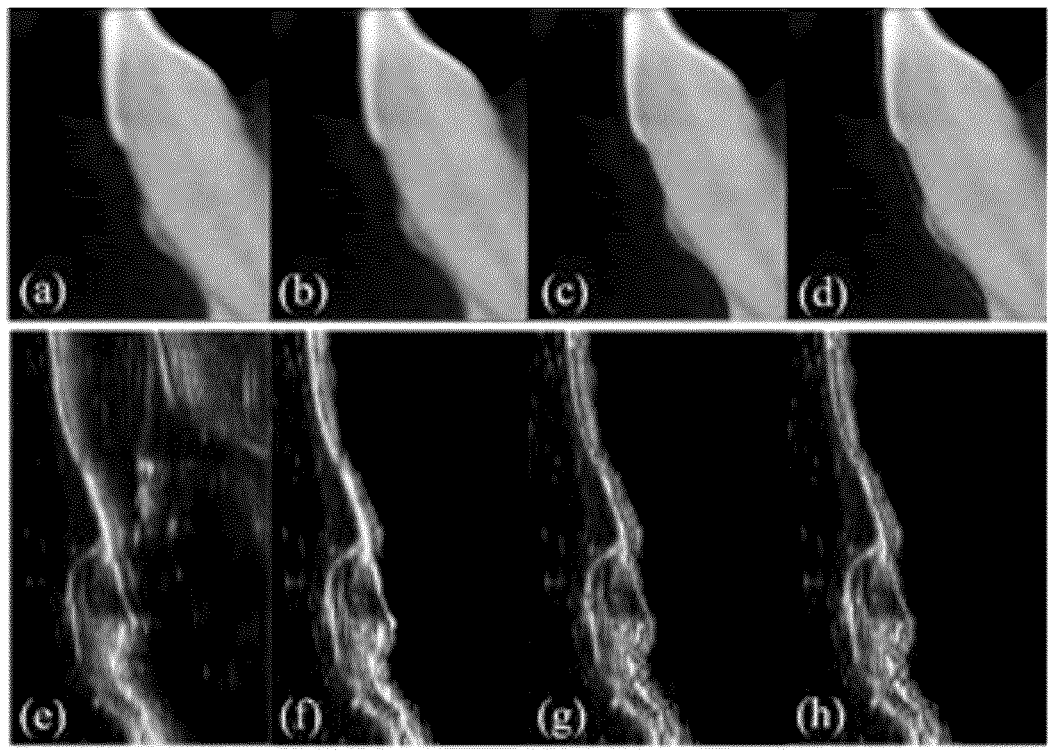
FIG. 12A is a series of 8 images depicting an example of Coherence Point Drift registration between ultrasound ("US") and CBCT images.

FIG. 12A illustrates an example of a CBCT point set and a correspondent US point set: part (a) represents the original CBCT image; part (b) represents the CBCT image after denoising; part (c) represents CBCT Point detection on the tooth and bone surface; part (d) represents the removal of the outliers in CBCT using the curve fitting; part (e) represents the original US image; part (f) represents the US image after segmentation and adaptive local contrast enhancement; part (g) represents US Point detection on the tooth and bone surfaces; and part (h) represents the removal of the outliers (yellow dots) in US using the curve fitting.

Figure 12B:
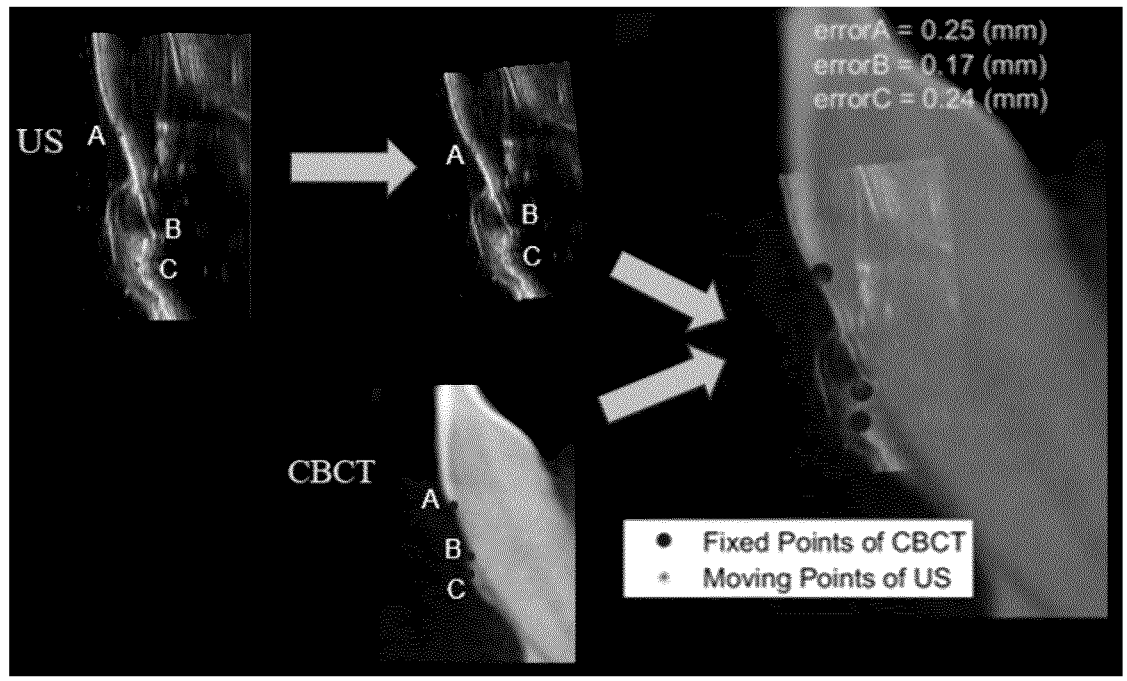
FIG. 12B is an image depicting an example of point-based evaluation for the registration.

FIG. 12B illustrates an example of point-based evaluation for the registration.

In some embodiments, smart device 5 can comprise software code segments configured to cause the smart device to eliminate artifacts caused by multiple reflections of ultrasonic waves in the ultrasonic raw signals by means of predictive deconvolution.

Figure 13A:
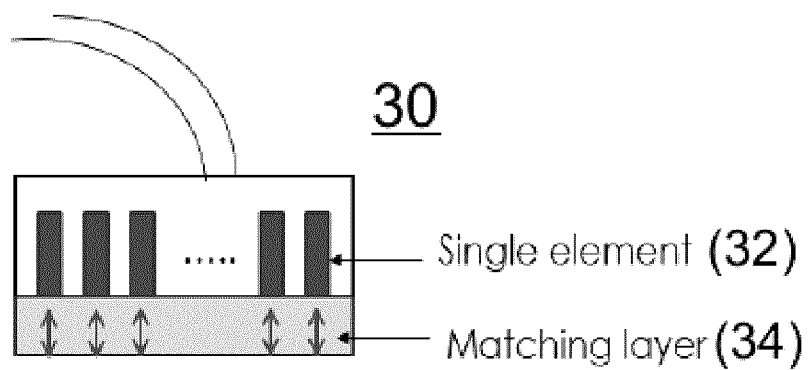
FIG. 13A is a block diagram depicting an ultrasonic transducer mounted on a matching layer.
Figure 13B:
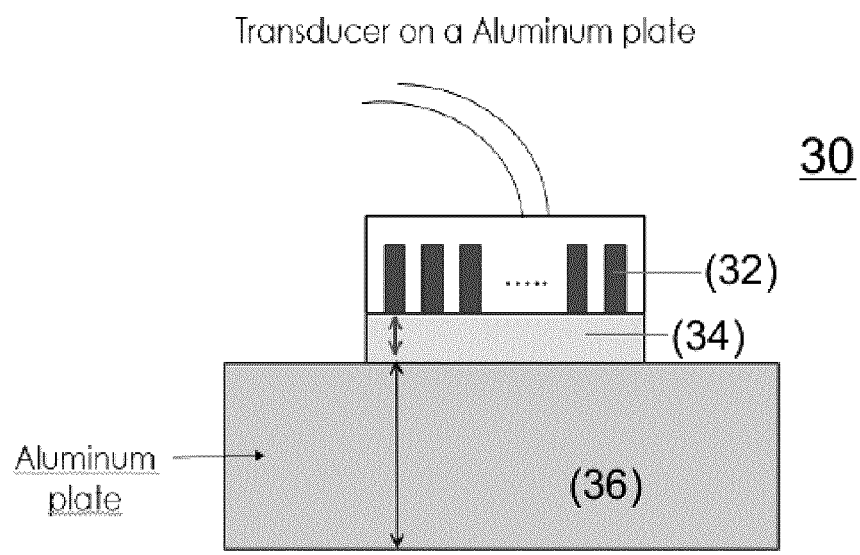
FIG. 13B is a block diagram depicting the ultrasonic transducer of FIG. 13A where the matching layer is mounted on an aluminum plate.

FIG. 13A illustrates an ultrasonic transducer 30 comprising individual transducing elements 32 mounted just on matching layer 34. FIG. 13B illustrates ultrasonic transducer 30 with matching layer 34 mounted on an aluminum plate 36. Reverberation within the matching layer 34 can create secondary echoes or multiple reflections, which can obscure the primary reflections. The multiple reflections can be separated in time by a constant which equals to the two-way travel time within the matching layer. The multiples can be predictable and can repeat themselves at a constant time interval. The time constant can be used as an input parameter to a predictive deconvolution filter. The filter can then be used to convolve the ultrasound data. The output can be the primary ultrasound data without multiple artefact.

Figure 13C:
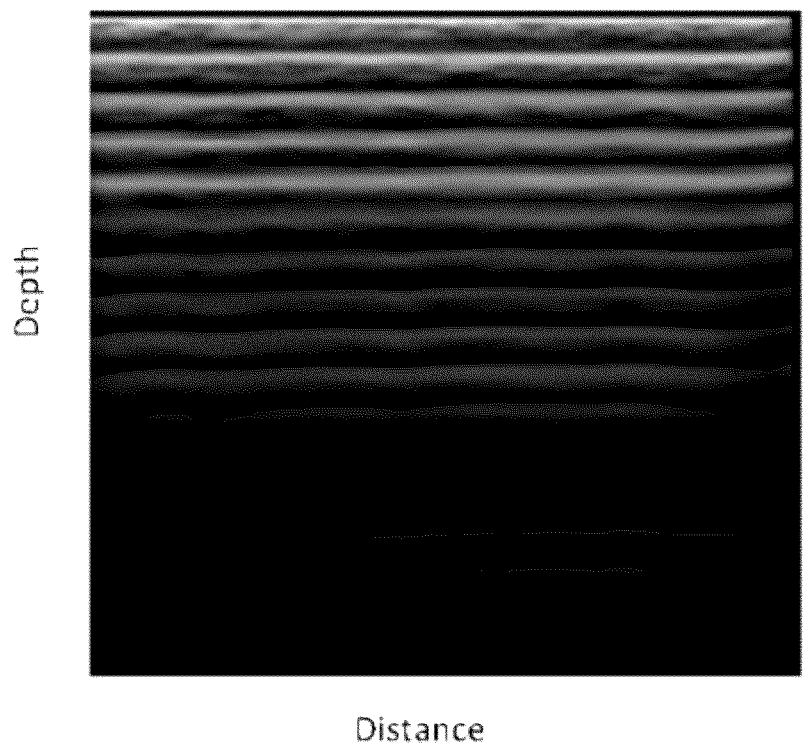
FIG. 13C is an image depicting an example of multiple reflections artifacts produced by the ultrasound transducer of FIG. 13A.
Figure 13D:
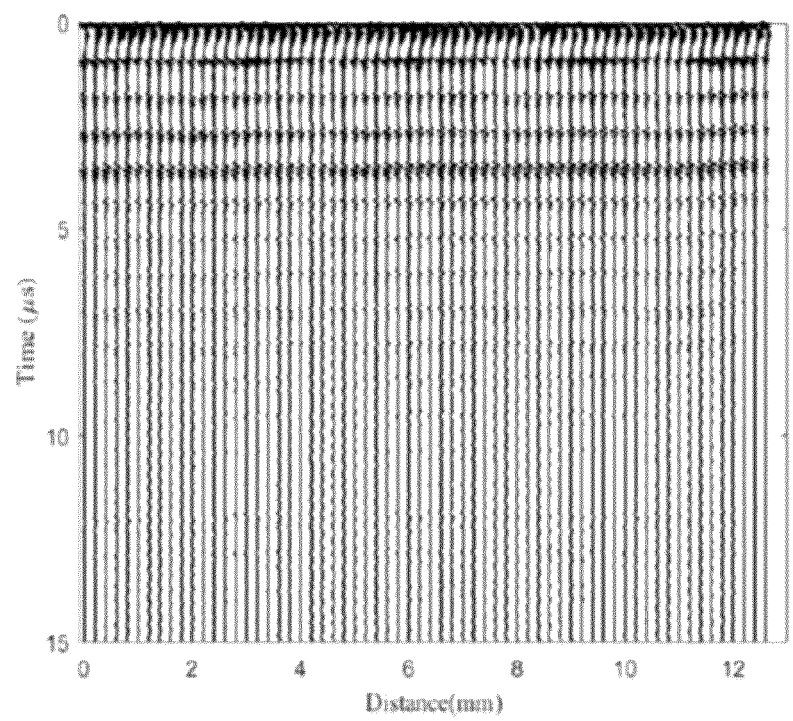
FIG. 13D is an image depicting an example of multiple reflections artifacts produced by the ultrasound transducer of FIG. 13B.
Figure 14A:
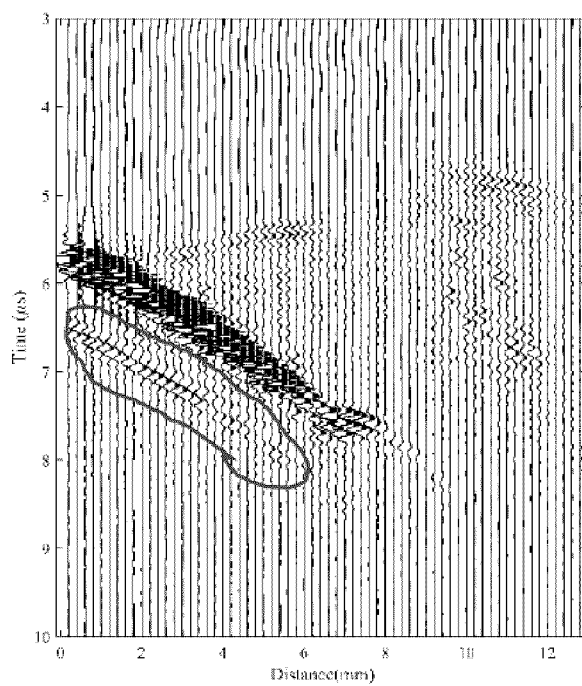
FIG. 14A is an image depicting an example without multiple reflections removal from a porcine ultrasound RF signal.
Figure 14B:
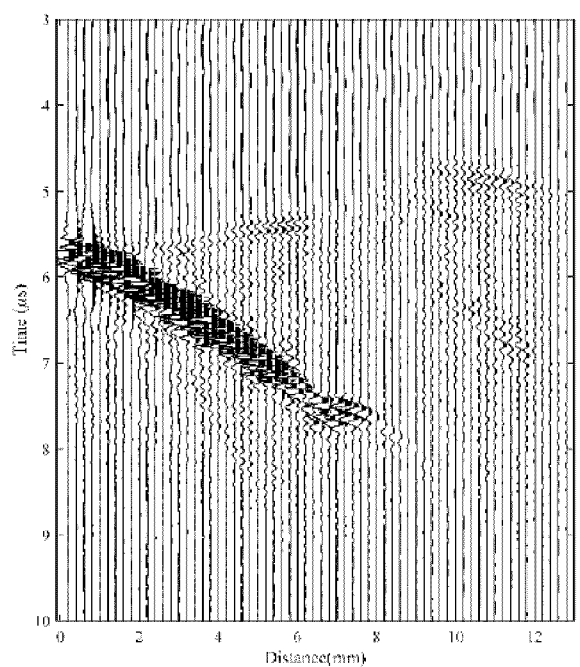
FIG. 14B is an image depicting an example multiple reflections removal from a porcine ultrasound RF signal.

FIG. 13C illustrates an example of multiple reflections artifacts from ultrasound transducer 30 as shown in FIG. 13A. FIG. 13D illustrates an example of multiple reflections artifacts from ultrasound transducer 30 as shown in FIG. 13B. FIG. 14A illustrates an example without multiple reflections removed from porcine ultrasound RF signals, where the reflections are circled in red, whereas FIG. 14B illustrates an example with the multiple reflections removed from porcine ultrasound RF signals.

In some embodiments, smart device 5 can comprise software code segments configured to cause the smart device to calculate the velocity of ultrasound signals in hard tissues of the patient and to correct the detected thickness of the alveolar bone of the patient. The corrected velocity is:

$$v_{corrected} = 2 \times h_{corrected}/t = 2 \times C \times h_{measured}/t = C \times V_{measured}$$

where the corrected thickness is:

$$h_{corrected} = C \times h_{measured}$$

Image Segmentation Using Machine Learning

The proposed machine learning method primarily consists of an encoder and a decoder component to capture the image features, and to construct and localize the segmentation labels, respectively. All the parameters of the neural networks were initialized and computed using the training data, where the parameter values were updated iteratively to minimize a cost function. Although not used for computing the neural net parameters, the validation set was also utilized during training to determine when to stop the parameter update to prevent overfitting.

Figure 16:
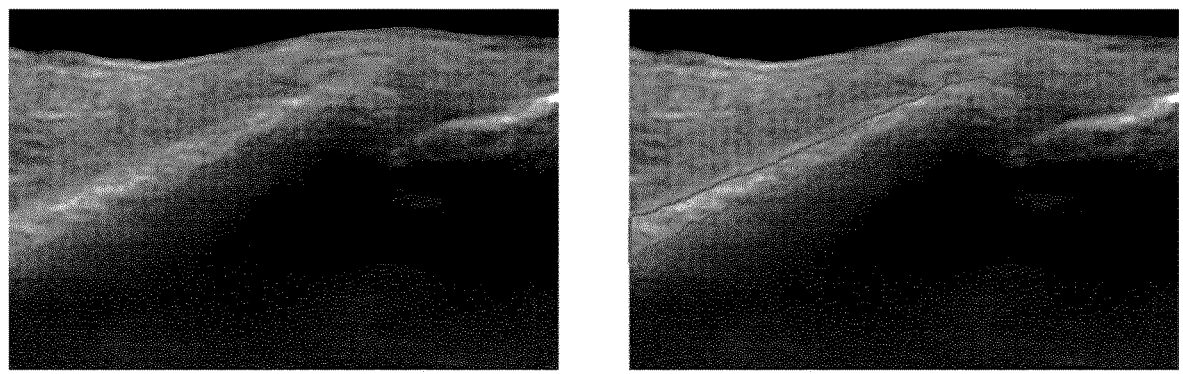
FIG. 16 is a series of 2 images depicting an example of automatic alveolar bone segmentation in ultrasound image using machine learning.

In some embodiments, smart device 5 can comprise software code segments configured to detect boundary and segments of the oral structure using multi-label graph cut optimization approach or machine learning. FIG. 15 illustrates an example of semi-automatic alveolar bone segmentation in ultrasound image using graph cut. The overall system diagram showing the proposed segmentation process: (a) Drawing a region (in yellow color) to determine the ROI on the original ultrasound image, (b) after de-noising using homomorphic filtering, (c) with contrast enhancement, (d) after smoothing using Gaussian filtering, (e) multi-label graph cuts segmentation in ROI, (f) alveolar bone extraction, and (g) final result showing delineation (in orange color) of alveolar bone boundary in the original ultrasound image. FIG. 16 illustrates an example of automatic alveolar bone segmentation in ultrasound image using machine learning.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the embodiments described herein.

Embodiments implemented in computer software can be implemented in software, firmware, middleware, microcode, hardware description languages, or any combination thereof. A code segment or machine-executable instructions can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted via any suitable means including memory sharing, message passing, token passing, network transmission, etc.

The actual software code or specialized control hardware used to implement these systems and methods is not limiting of the embodiments described herein. Thus, the operation and behavior of the systems and methods were described without reference to the specific software code being understood that software and control hardware can be designed to implement the systems and methods based on the description herein.

When implemented in software, the functions can be stored as one or more instructions or code on a non-transitory computer-readable or processor-readable storage medium. The steps of a method or algorithm disclosed herein can be embodied in a processor-executable software module, which can reside on a computer-readable or processor-readable storage medium. A non-transitory computer-readable or processor-readable media includes both computer storage media and tangible storage media that facilitate transfer of a computer program from one place to another. A non-transitory processor-readable storage media can be any available media that can be accessed by a computer. By way of example, and not limitation, such non-transitory processor-readable media can comprise RAM, ROM, EEPROM, CD-ROM or other optical disk storage, magnetic disk storage or other magnetic storage devices, or any other tangible storage medium that can be used to store desired program code in the form of instructions or data structures and that can be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and/or instructions on a non-transitory processor-readable medium and/or computer-readable medium, which can be incorporated into a computer program product.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. An apparatus for imaging an oral structure of upper and lower jaws at facial and lingual surfaces of a patient, the apparatus comprising:
   a) an ultrasound probe comprising an array of piezoelectric transducer crystals operating at an ultrasonic frequency of at least 20 megahertz, the ultrasound probe further comprising a handle;
   b) a probe head configured for housing the array of piezoelectric transducer crystals, the probe head disposed on a tilt mechanism attached to the handle, the tilt mechanism comprising a first rotating joint configured for rotation about a first axis operatively coupled to the probe head, the tilt mechanism further comprising a second rotating joint configured for rotation about a second axis disposed between the first rotating joint and the handle, wherein the first axis is not parallel to the second axis, thereby configuring the probe head for rotation about the first axis and tilt about the second axis relative to the handle;
   c) a gel pad comprising one or both of polymer and hydrogel configured to be disposed on the probe head and positioned between the array of piezoelectric transducers crystals and the oral structure;
   d) an ultrasound data acquisition unit, wherein the ultrasound data acquisition unit comprises:
      i) a microcontroller or digital signal processor or an application specific integrated circuit ("ASIC") operatively coupled to the array of piezoelectric transducer crystals and configured to control ultrasound signal generation, ultrasound signal acquisition, processing of acquired ultrasound signals and communication of the acquired ultrasound signals; and
      ii) a wireless communications transceiver module operatively coupled to the microcontroller or digital signal processor, the wireless communications transceiver module configured to wirelessly transmit the acquired ultrasound signals to a peripheral smart device comprising a visual display, wherein the peripheral smart device comprises a memory further comprising software code segments configured to cause the peripheral smart device to carry out one or more steps comprising of:
         1. enhancing the acquired ultrasound signals representing images of alveolar bone structure and boundaries of enamel, dentin and gingiva of a patient using a noise removal filter, a contrast enhancement, an edge enhancement, and machine learning, wherein the noise removal filter comprises an adaptive median filter operating on a rectangular window area Sxy centered on X and Y coordinates of a pixel of the images wherein a value of the pixel is replaced for each window-filtering time;
         2. identifying peaks and troughs of one or more of cementoenamel junctions, alveolar bone crests and gingival sulcus of the patient using object detection and recognition;
         3. calculating changes in bone level or pocket depth of the patient using measurements between the acquired ultrasound images of different periods;
         4. comparing the acquired ultrasound images of the patient with one or more of cone beam computerized tomography (CBCT) images of an oral structure of the patient and enhancing visualization of soft and hard tissues of the oral structure;
         5. eliminating artifacts caused by multiple reflections of ultrasonic waves in the acquired ultrasonic images of the oral structure;
         6. calculating ultrasonic velocity for the hard tissues; and
         7. Correcting the detected thickness of the hard tissues;
   e) a battery for providing electrical power to the ultrasound data acquisition unit; and
   f) a control switch configured for controlling the operation of the apparatus.

2. The apparatus as set forth in claim 1, wherein the gel pad comprises low ultrasonic attenuation at the ultrasonic frequency and is safe for use in the oral structure of the patient, wherein the gel pad is configured to cover the array of piezoelectric transducer crystals, and wherein the gel pad is further configured to be shaped to conform to the oral structure to be imaged.

3. The apparatus as set forth in claim 1, further comprising a control foot pedal configured for wireless communication with the wireless communications transceiver module, the foot pedal configured to control the operation of the apparatus.

4. The apparatus as set forth in claim 1, wherein the wireless communications transceiver module is configured to communicate using one or more communications protocols.

5. The apparatus as set forth in claim 1, wherein the microcontroller or digital signal processor or ASIC is configured to multiplex ultrasound signals transmitted to the array of piezoelectric transducer crystals.

6. The apparatus as set forth in claim 1, wherein the microcontroller or digital signal processor further comprises an analog-to-digital converter configured to digitize the acquired ultrasound signals received from the array of piezoelectric transducer crystals.

7. The apparatus as set forth in claim 1, wherein the peripheral smart device comprises one or more of a general purpose computer, a personal digital assistant, a smart phone, a smart television and a computing tablet.

8. The apparatus as set forth in claim 7, wherein the peripheral smart device comprises an operating system.

9. The apparatus as set forth in claim 1, wherein the ultrasound data acquisition unit comprises a battery management circuit.

10. The apparatus as set forth in claim 1, wherein the software code segments are configured to cause the peripheral smart device to carry out a step of detecting boundary and segments of the oral structure using one or more of multi-label graph cut approach, contrast enhancement, a homomorphic filter, and machine learning.

11. The apparatus as set forth in claim 1, wherein the software code segments are configured to cause the peripheral smart device to carry out a step of extracting interest landmarks of the oral structure of the patient using a combination of region extraction, edge detection, local maximum and/or local minimum localization and one or more of adaptive median filtering, homomorphic filtering, and contrast enhancement.

12. The apparatus as set forth in claim 1, wherein the software code segments are configured to cause the peripheral smart device to carry out a step of measuring changes of the oral structure over a period of time using the measurements from ultrasound images of different periods of time.

13. The apparatus as set forth in claim 1, wherein the software code segments are configured to cause the peripheral smart device to carry out a step of fusing the ultrasound images of the oral structure with one or more of CBCT images of the oral structure using a combination of region extraction, edge detection, probability-based set registration, and one or more of adaptive median filtering, homomorphic filtering, and contrast enhancement.

14. The apparatus as set forth in claim 1, wherein the software code segments are configured to cause the peripheral smart device to carry out a step of predicting and removing the artifacts caused by the multiple reflections of the ultrasonic waves in the acquired ultrasonic images of the oral structure.

15. The apparatus as set forth in claim 1, wherein the array of piezoelectric transducer crystals comprises a configuration of 1 by 128 of the piezoelectric transducer crystals in a spaced-apart configuration.

16. The apparatus as set forth in claim 1, wherein the noise removal filter comprises a Gaussian filter, the Gaussian filter comprising a convolution operation applied to an image pixel of the images with a 2×2 Gaussian kernel to remove high-frequency noise.

17. The apparatus as set forth in claim 1, wherein the noise removal filter comprises a homomorphic filter, the homomorphic filter comprising a process further comprising:
 a) calculating a Fourier transform of a logarithmic compressed image;
 b) applying a high-pass filter function; and
 c) constructing an inverse Fourier transform of the image.

* * * * *